United States Patent [19]

Pennell

[11] 4,080,219

[45] Mar. 21, 1978

[54] COLLATERAL DRYING PROCESS

[75] Inventor: Anthony Robin Pennell, Gravesend, England

[73] Assignee: The Associated Portland Cement Manufacturers Limited, London, England

[21] Appl. No.: 732,058

[22] Filed: Oct. 13, 1976

[30] Foreign Application Priority Data

Oct. 21, 1975 United Kingdom ............... 43147/75

[51] Int. Cl.² ................................................ C04B 7/36
[52] U.S. Cl. ..................................... 106/100; 106/103
[58] Field of Search ................................ 106/100, 103

[56] References Cited

U.S. PATENT DOCUMENTS 3,703,275 11/1972 Sylvest ................................. 106/100
3,986,886 10/1976 Sylvest ................................. 106/100

Primary Examiner—J. Poer
Attorney, Agent, or Firm—Diller, Brown, Ramik & Wight

[57] ABSTRACT

A method of utilizing waste heat from a fuel-fired electrical power generation or steam raising plant, wherein flue gas from said plant is conducted through a heat exchange zone in contact with relatively cool wet material for making Portland cement.

8 Claims, 1 Drawing Figure

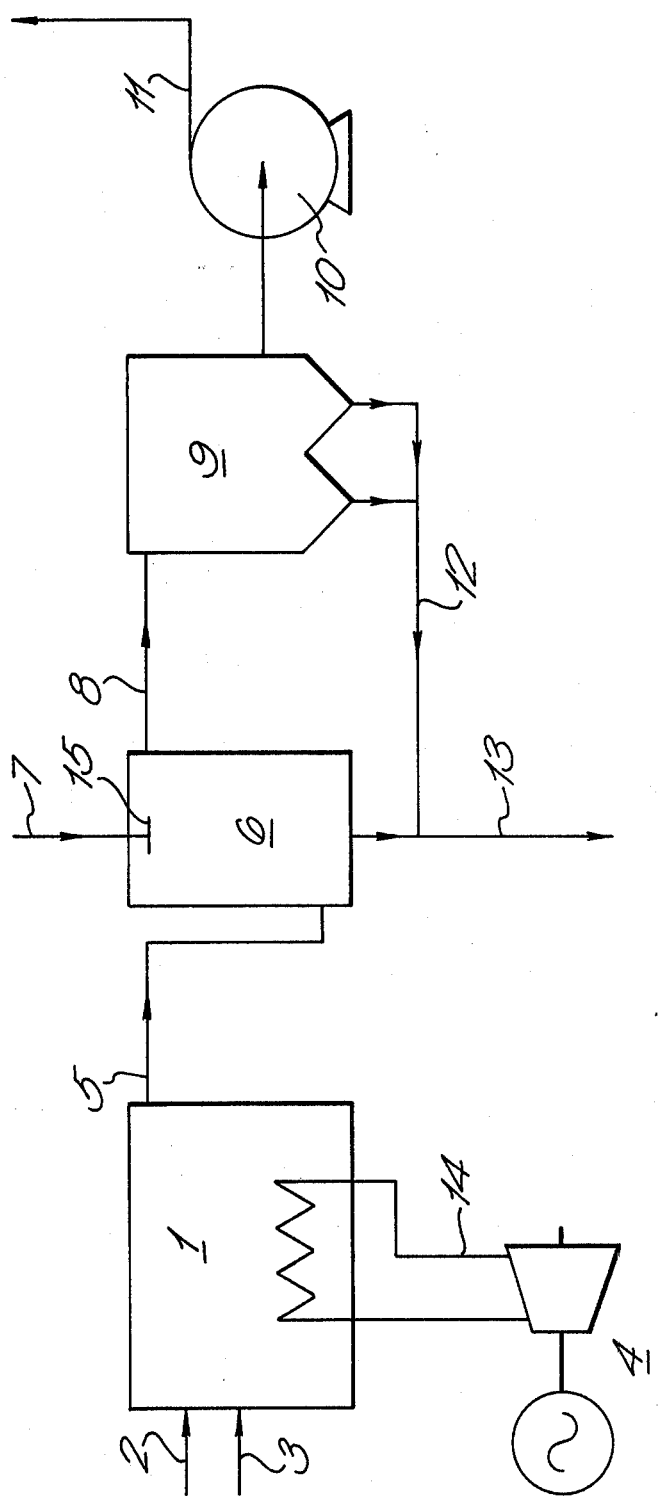

COLLATERAL DRYING PROCESS

The present invention relates to the useful application of thermal output energy normally regarded as unavoidably expendable in the generation of electrical power, and more particularly to the advantageous employment of power station flue gases which may contain pulverised or other fuel ash.

The nature of such flue gases, and especially of entrained solid combustion products, such as ash, resulting from the burning of fuel such as oil or pulverised coal in the generation of power, has hitherto discouraged or prevented their adoption as a source of heat, because of their deleterious effect on materials desired to be heat treated. Consequently the large amount of thermal energy borne away in the flue gases has been lost to the atmosphere and represents a considerable waste of energy, equivalent in a typical case of a 140 megawatt power station to as much as 50 million kilocalories per hour. Moreover the disposal of flue gas products such as ash and dust calls for the expenditure of effort and resources of equipment.

In a broad sense the invention provides a method of utilising waste heat from a fuel-fired electrical power generating plant, wherein flue gas from said plant is conducted through a heat exchange zone in contact with relatively cool wet material for making Portland cement.

In the wet or semi-wet process of Portland cement manufacture, the raw materials, generally a blend of calcareous and argillaceous materials, for making the cement are mixed and prepared as an aqueous slurry and it is known to dry the slurry before the mixed raw materials enter the kiln to be calcined to form Portland cement clinker. Known methods of drying a slurry of cement-making materials before they are fed to the kiln include (a) passing the slurry into a spray-drier in which it becomes a finely divided dry solid, and (b) passing the filtered and nodulised slurry into a preheater.

According to the present invention we provide a method of reducing the water content of material employed to produce Portland cement clinker wherein flue gas at a temperature above that of said material, from a fuel-fired electrical power generating plant, is brought into direct contact with said material. The power station may be fired by any conventional fuel for the purpose, such as coal, especially pulverised coal, oil or gas, or low grade fuel as burnt in a fluid bed combustor/boiler combination. The flue gas is normally the effluent from the fuel firing zone of the power generating plant and contains entrained ash.

In order to gain the maximum benefit from the invention the zone in which the cement materials are contacted by the flue gas should be one through which the flue gas passes without suffering an unduly large pressure drop, so that existing installed fan power is adequate and the gas velocity does not become so high that contact is too short and too much dust is entrained in the contactor outlet gases. Duration of contact between the cement materials and the flue gas may be relatively short, e.g., a matter of seconds, as in a spray drier.

Preferably the cement materials and the flue gas are contacted by supplying the hot flue gas to a spray drier used for drying cement raw material slurry. Such slurry may contain, for instance, up to 255 percent by weight of water. In the contact zone provided by a spray drier the water can be evaporated from the fine suspended solids before impingement of the solids against static structures would otherwise give rise to build-up of moist particles. The water content of the cement raw materials is preferably reduced in the spray drier until the resulting solid powder is sufficiently dry to be free-flowing, and contains at most a few percent of moisture. This resulting solid powder may then be advantageously converted to Portland cement clinker, by firing in a dry-process rotary kiln and grinding the resulting clinker or by back-mixing with slurry before feeding to a wet process kiln thereby effecting a reduction in the kiln feed slurry moisture content with consequent reduction in the consumption of fossil fuel in the kiln. The products entrained in the power station flue gas are in no way deleterious to the ultimate cement and can be allowed for in the slurry composition. The equipment associated with a cement slurry spray drier is in any case necessarily designed to cope with the entrainment of dried slurry dust and ash in the outlet gas.

It is of course necessary to place the drying plant close to the power station to take advantage of the heat available in the flue gas, and in situations where as cement works and a power station are neighbours the invention is of especial advantage. However, the transport of cement slurry or moist cement materials, and the return of dried product, from and to a more remote cement works by road, rail or water is readily and economically feasible so that in any event the heat recovered from the flue gas and applied to the slurry, leads to a reduction in heat consumed or an increase in throughput, at the cement kiln.

In the preferred embodiment of the process flue gas from the power station is ducted to a normal spray drier for cement slurry for use as the drying medium, and the gaseous effluent from the spray drier may be dealt with either through the power station exhaust facilities hitherto used directly for the flue gas, or through the corresponding facilities of the cement works if more convenient. In the latter case the power station exhaust treatment facilities can be dispensed with or put in reserve.

Apart from the clearly advantageous disposal of any ash entrained in the flue gas, the invention also offers to the power station an effective way of disposing of sulphur-containing flue gases, since the sulphur mostly finds its way harmlessly into the cement materials and the cement works is adapted to deal with sulphur in its own fuel.

The employment of flue gases from a power station in the manner of the invention offers the further advantage that the materials of which plant is made, such as ducting, fans, flues and gas cleaning equipment, for handling power station effluent combustion gases, may enjoy a longer serviceable life under given boiler operational severity, or materials hitherto required for treating the effluent gases may amount to less, by virtue of the reduction in acidic material present in the flue gas used in the invention.

The invention can be advantageously applied regardless of the relative capacities of the power station and the cement works, but it is noteworthy that a typical power station flue gas output is found to be commensurate with the slurry drying requirements of a typical cement works.

The invention is illustrated by the accompanying diagram which is a flow sheet for a slurry drying process according to the invention.

Referring to the drawing, there is shown the boiler plant 1 of an electrical power generating station, in which steam is raised in a steam/water cycle 14 by burning fuel supplied at 2 with combustion air supplied at 3. The steam is fed to a turbogenerator represented diagrammatically at 4 to product electrical energy in a conventional manner.

Gaseous and gas-entrained combustion products are exhausted from the boiler plant by conduit 5, either directly or after passing through an air preheater (not shown) for the boiler combustion air, instead of being sent at this stage to the power station stack via the usual effluent treatment equipment. The gaseous combustion products, including unconsumed combustion air initially present in excess to ensure fully oxidised combustion products, amount to the order of 3600 to 3900 $Nm^3/MWh$, from a 140 megawatt power station, normally at about 130° C to 350° C or higher, e.g., up to 900° C.

The gaseous and gas-entrained combustion products in conduit 5 are fed to a contactor 6. The contactor 6 may be installed at the power station site together with the associated equipment, for dealing with the contactor effluent, which may already be part of the power station equipment; or the contactor may be already available together with associated effluent equipment at a neighbouring cement works site.

In either case, in the contactor 6 which is for example a spray drier, slurried cement raw materials, supplied at ambient temperature at 7 to an atomiser wheel 15, are spray dried in the hot atmosphere provided by the combustion gases. By means of the induced draught fan 10 the gases are withdrawn through conduit 8 and pass through the exhaust cleaning equipment 9 including an electrostatic dust precipitator, to be exhausted finally to a stack at 11.

The apparatus for spray drying, gas cleaning and exhausting may be such as is known for these purposes and include a return line 12 for dust, i.e., cement raw material dust and flue dust, extracted from the gases, which joins the dried cement raw materials falling from the contactor 6 in line 13, to be forwarded to the cement making plant.

Some 170 to 920 Kg/MWh of dry cement raw meal are thus made available for further processing in a cement kiln close by or at a site remote from the power station.

The invention is in no way limited to operations on this particular scale of throughput but the use of the foregoing apparatus is further illustrated in the following Examples.

EXAMPLE 1

The contactor 6 referred to above is supplied through conduit 5 with flue gas at 350° C containing 3.2 percent oxygen, and carrying 0.03 Kg water per kg of dry gas, at the rate of 467,500 $Nm^3/hr$, obtained directly from the flue, i.e, not after passing through a heat exchanger for combustion air preheating, of a 120 megawatt power generating unit.

Cement raw slurry at 38 percent moisture content is fed to the contactor 6 by line 7. It is necessary to operate with an exhaust gas temperature from contactor 6 at which the gases are saturated and are above the dew point. An exhaust gas temperature of 70° C is found to be suitable.

Heat and moisture balance calculations show that 109,400 Kg/hr of dry cement raw meal can be produced, with 0.140 Kg water per Kg of dry gas at 70° C in the effluent (= 55 percent relative humidity). In other words if hot flue gas is taken immediately from the flue of a 120 megawatt generating unit, it will be able to dry slurry equivalent to 109.4 tonne/hour dried meal.

EXAMPLE 2

Following Example 1 but taking the flue gas from the generating unit only after it has been used in a combustion air preheater, the flue gas temperature is thereby reduced to 130° C. Consequently the slurrydrying capacity is lower and it is found that at a gas exit temperature from the contactor of 80° C, 20.000 Kg/hr of dried meal can be produced.

What is claimed is:

1. The method of increasing the efficiency of Portland cement manufacture, which comprises the steps of:
   (a) firing a heat generating unit in an electrical power generation plant with fuel and air to generate electrical power and a continuous stream of flue gas at temperature in excess of 130° C;
   (b) directly contacting the flue gas of step (a) with an aqueous slurry of Portland cement raw material for a time sufficient to produce a free-flowing solid powder which is Portland cement raw meal;
   (c) treating the flue gas effluent from step (b) to separate entrained dust therefrom and then discharging the gas to the atmosphere; and
   (d) introducing the raw meal of step (b) into one end of a rotary kiln in a Portland cement making plant and firing the kiln with fuel and air in amount sufficient to discharge Portland cement clinker from the other end of said kiln.

2. The method as defined in claim 1 wherein said electrical power generating plant and said Portland cement making plant are remotely situated, and including the step of transporting the raw meal of step (b) from the power generating plant to the cement making plant.

3. The method as defined in claim 2 including the step of transporting the slurry of step (b) from the cement making plant to the power generating plant.

4. The method as defined in claim 1 wherein the electrical power generating plant and the Portland cement making plant are in close proximity and including the step of admixing the gaseous effluent from said kiln with the flue gas effluent of step (b) and treating them simultaneously in step (c).

5. The method as defined in claim 1 wherein the flue gas and slurry of step (b) are contacted in a spray drier.

6. The method as defined in claim 2 wherein the flue gas and slurry of step (b) are contacted in a spray drier.

7. The method as defined in claim 3 wherein the flue gas and slurry of step (b) are contacted in a spray drier.

8. The method as defined in claim 4 wherein the flue gas and slurry of step (b) are contacted in a spray drier.

* * * * *